United States Patent
Ishihara et al.

(10) Patent No.: US 12,122,463 B2
(45) Date of Patent: Oct. 22, 2024

(54) STEERING APPARATUS

(71) Applicant: Knorr-Bremse Commercial Vehicle Systems Japan Ltd., Sakado (JP)

(72) Inventors: Takuya Ishihara, Maebashi (JP); Toshiro Yoda, Higashimatsuyama (JP); Shogo Ishikawa, Higashimatsuyama (JP)

(73) Assignee: Knorr-Bremse Commercial Vehicle Systems Japan Ltd., Saitama (JP)

(*) Notice: Subject to any disclaimer, the term of this patent is extended or adjusted under 35 U.S.C. 154(b) by 714 days.

(21) Appl. No.: 17/291,029

(22) PCT Filed: Oct. 24, 2019

(86) PCT No.: PCT/JP2019/041745
§ 371 (c)(1),
(2) Date: May 4, 2021

(87) PCT Pub. No.: WO2020/095705
PCT Pub. Date: May 14, 2020

(65) Prior Publication Data
US 2021/0387667 A1 Dec. 16, 2021

(30) Foreign Application Priority Data
Nov. 6, 2018 (JP) .................. 2018-208735

(51) Int. Cl.
*B62D 5/04* (2006.01)
(52) U.S. Cl.
CPC ......... *B62D 5/0448* (2013.01); *B62D 5/0406* (2013.01); *B62D 5/0454* (2013.01)

(58) Field of Classification Search
CPC ... B62D 5/0448; B62D 5/0406; B62D 5/0454
See application file for complete search history.

(56) References Cited

U.S. PATENT DOCUMENTS 6,474,437 B1 * 11/2002 Elser .................. B62D 5/06
                                                                180/406
6,691,819 B2    2/2004 Menjak et al.
(Continued)

FOREIGN PATENT DOCUMENTS

| CN | 1675100 A | 9/2005 |
| CN | 105827048 A | 8/2016 |

(Continued)

OTHER PUBLICATIONS

International Search Report issued in corresponding application No. PCT/JP2019/041745 dated Jan. 21, 2020, with English translation.
(Continued)

*Primary Examiner* — Tony H Winner
(74) *Attorney, Agent, or Firm* — FOLEY & LARDNER LLP

(57) ABSTRACT

A steering apparatus includes first and second electric motors that rotate a steering shaft via speed reduction mechanisms, and the motors being disposed to face each other. The first electric motor, a first motor pulley, a second motor pulley and the second electric motor are arranged in order in a rotation axis direction. When a first system electric actuator (including a first nut and the first electric motor) and a second system electric actuator (including a second nut and the second electric motor) are provided to the common steering shaft, in a first axis direction, the first and second nuts can be arranged close to each other, reducing sizes of the peripheries of the nuts.

11 Claims, 8 Drawing Sheets

(56) References Cited

U.S. PATENT DOCUMENTS

| | | | | |
|---|---|---|---|---|
| 6,929,090 B2* | 8/2005 | Furumi | ................... | B62D 5/04 |
| | | | | 180/444 |
| 7,290,638 B2* | 11/2007 | Shiino | ................... | B62D 5/046 |
| | | | | 180/444 |
| 2006/0055139 A1 | 3/2006 | Furumi et al. | | |
| 2015/0298722 A1* | 10/2015 | Witte | ................... | B62D 5/0421 |
| | | | | 180/407 |
| 2015/0360715 A1* | 12/2015 | Shimizu | ............... | B62D 5/0484 |
| | | | | 701/43 |
| 2016/0218583 A1 | 7/2016 | Hayashi | | |
| 2017/0008554 A1 | 1/2017 | Hirotani et al. | | |
| 2018/0118252 A1* | 5/2018 | Kondo | ................. | B62D 5/0424 |
| 2018/0346015 A1* | 12/2018 | Tomikawa | ............ | F16H 55/171 |

FOREIGN PATENT DOCUMENTS

| | | |
|---|---|---|
| CN | 105993115 A | 10/2016 |
| CN | 107042842 A | 8/2017 |
| JP | 2004-074831 A | 3/2004 |
| JP | 2016-140149 A | 8/2016 |
| JP | 2016-150645 A | 8/2016 |
| WO | WO-2015/122069 A1 | 8/2015 |

OTHER PUBLICATIONS

Written Opinion issued in corresponding application No. PCT/JP2019/041745 dated Jan. 21, 2020, with English translation.
CN Office Action in CN Appl. Ser. No. 201980073112.0 dated Aug. 23, 2022, with translation (22 pages).

* cited by examiner

STEERING APPARATUS

TECHNICAL FIELD

The present invention relates to a steering apparatus.

BACKGROUND TECHNOLOGY

A patent document 1 discloses a steering apparatus equipped with a hydraulic type first power steering mechanism and an electric type second power steering mechanism.

PRIOR ART REFERENCE

Patent Document

Patent Document 1: Japanese Patent Application Publication 2016-150645

SUMMARY OF THE INVENTION

Problem(s) to be Solved by the Invention

In the above conventional steering apparatus, an electric motor directly rotates a steering shaft, and the size of the electric motor therefore becomes large. An object of the present invention is to provide a steering apparatus in which an increase in the size of the electric motor is suppressed.

Means for Solving the Problem(s)

In the steering apparatus according to an embodiment of the present invention, a pair of electric motors rotates a steering shaft via respective speed reduction mechanisms, and a pair of the electric motors is provided so as to face each other.

Effect of the Present Invention

Consequently, since the speed reduction mechanisms of a pair of the respective electric motors can be arranged adjacent to each other, an increase in the sizes of the speed reduction mechanisms in the rotation axial direction of the steering shaft is suppressed.

MODE FOR IMPLEMENTING THE INVENTION

In the following, a mode for implementing the present invention will be explained based on the drawings.

First Embodiment

Figure 1:
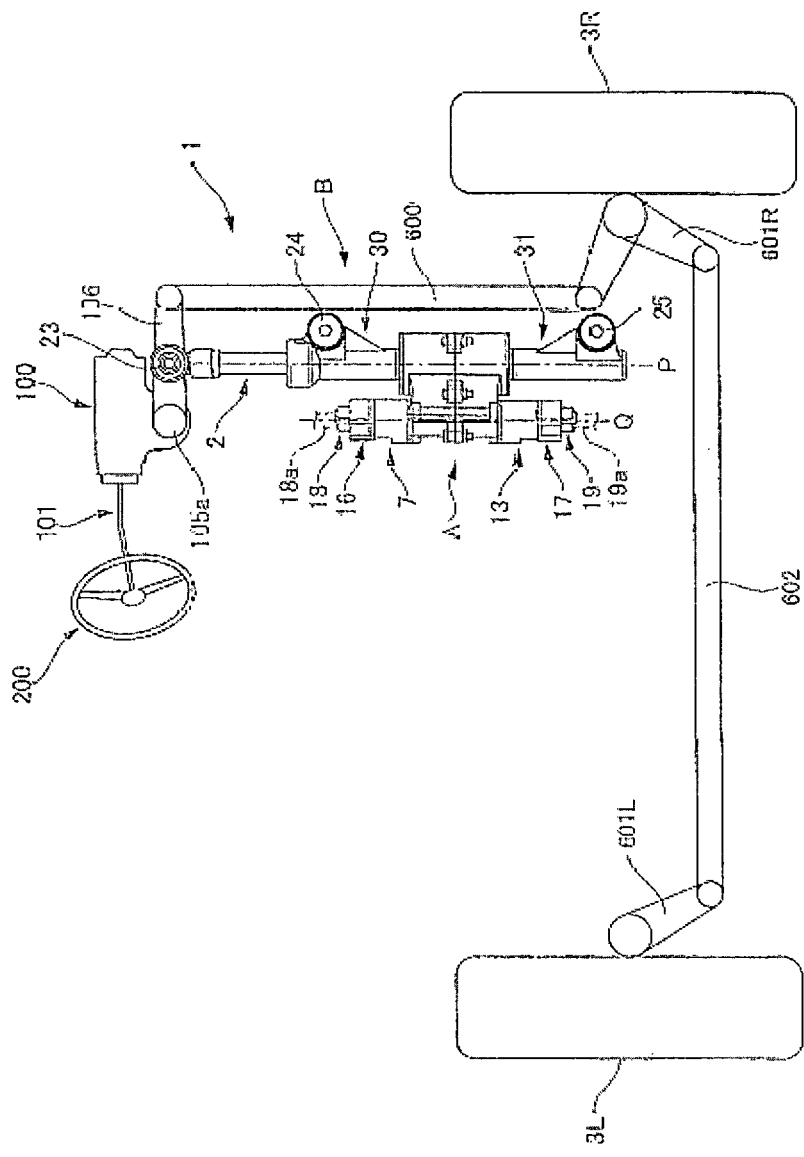
FIG. 1 is a schematic drawing showing the configuration of a steering system to which a steering apparatus of a first embodiment is applied.

FIG. 1 is a schematic drawing showing the configuration of a steering system to which a steering apparatus 1 of a first embodiment is applied.

The steering apparatus 1 includes a steering mechanism 100 connected to a steering wheel 200, an assist mechanism A and a transmission mechanism B. The steering mechanism 100 is a ball-nut type, and includes a steering input shaft 101, a sector shaft 105a, a pitman arm 106 and the like. The details will be explained below. The rotation force (steering torque) generated by the steering operation of the steering wheel 200 by a driver is input to the steering mechanism 100 via the steering input shaft 101. The steering mechanism 100 transmits the rotation force generated by the steering operation to the transmission mechanism B. In addition, a steering shaft 2 of the assist mechanism A is connected to the middle part of the pitman arm 106 via a ball joint 23. That is, the steering input shaft 101 is mechanically connected to the steering wheel 200, the steering shaft 2 of the assist mechanism A and right and left steered wheels 3R and 3L, and is provided such that the rotation force of the steering wheel 200 is transmitted in the order of the steering wheel 200, the steering input shaft 101, the steering shaft 2 and the right and left steered wheels 3R and 3L. With this, by interposing the steering shaft 2 of the assist mechanism A in the middle of a steering system from the steering wheel 200 to the right and left steered wheels 3R and 3L, steering control can be carried out while using the layout of the existing steering system.

The transmission mechanism B includes a drag link 600 and a tie rod 602. The drag link 600 is connected to the pitman arm 106 and a knuckle arm 601R of the right-side steered wheel 3R. The tie rod 602 is connected to knuckle arms 601R and 601L of the right and left steered wheels 3R and 3L. The drag link 600 transmits the rotation of the pitman arm 106 to the knuckle arm 601R. The movement transmitted to the knuckle arm 601R is transmitted to the knuckle arm 601L of the left-side steered wheel 3L via the tie rod 602.

The assist mechanism A includes: a first housing 30 and a second housing 31; the steering shaft 2 accommodated in the first and second housings 30 and 31 and connected to the middle part of the pitman arm 106 via the ball joint 23; a first electric motor 7 and a second electric motor 13 disposed so as to face each other and arranged such that, when the straight line which is parallel to the longitudinal direction of the steering shaft 2 and passes through the center of the steering shaft 2 in the cross section perpendicular to the longitudinal direction of the steering shaft 2 is set as a first axis P, a rotation axis Q of the after-mentioned first motor output shaft 71 and second motor output shaft 131 of the first electric motor 7 and the second electric motor 13 having the same axis is offset to the first axis P; a first ECU 16 of the first electric motor 7 which is disposed on the side opposite to the second electric motor 13 side; a first connector 18 to which a first power supply wiring 18a can be connected; a second ECU 17 of the second electric motor 13 which is disposed on the side opposite to the first electric motor 7 side; and a second connector 19 to which a second power supply wiring 19a can be connected. That is, in the direction of the rotation axis Q, from the upper direction of the drawing, the first connector 18, the first ECU 16, the first electric motor 7, the second electric motor 13, the second ECU 17 and the second connecter 19 are arranged in this order. With this, it becomes possible to extend the first power supply wiring 18a and the second power supply wiring 19a to the outside from the first ECU 16 and the second ECU 17, and the wiring of the first power supply wiring 18a and the second power supply wiring 19a becomes easy. In addition, wirings for outputting electrical signals, such as a torque signal, a steering angle signal and a vehicle speed signal, may be connected to each of the first connector 18 and the second connector 19, in addition to the first power supply wiring 18a and the second power supply wiring 19a. Moreover, as mentioned above, an end portion of the steering shaft 2 is connected to, via the ball joint 23, the middle part of the pitman arm 106 arranged between the after-mentioned sector gear 105 and the right and left steered wheels 3R and 3L. With this, mountability to vehicles, such as trucks and busses, each mounting a steering apparatus having a ball-nut type steering mechanism is enhanced. In addition, the assist mechanism A is mounted by fixing a pair of rubber mounts 24 and 25 to a vehicle with bolts which are not shown.

Figure 2:
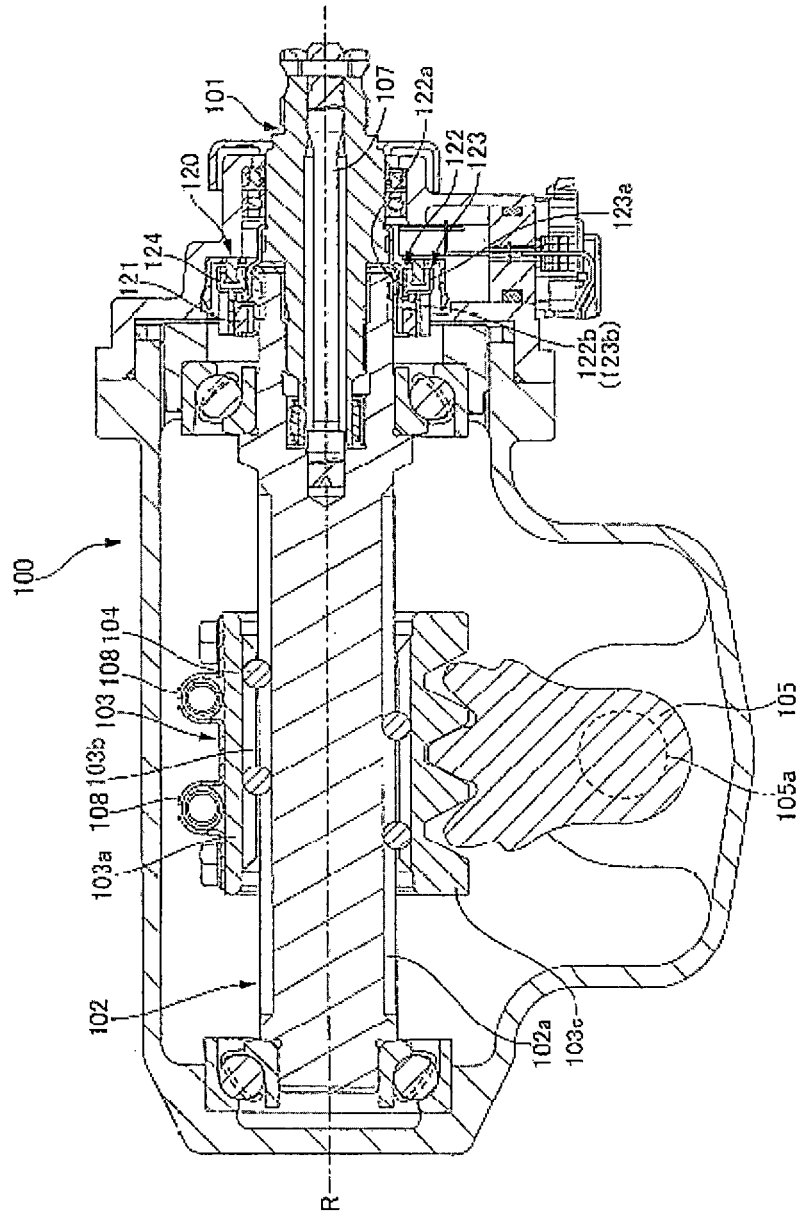
FIG. 2 is a sectional view of a steering mechanism of the first embodiment.

FIG. 2 is a sectional view of the steering mechanism 100 of the first embodiment.

The steering mechanism 100 includes a steering output shaft 102, a third nut 103, third circulating balls 104 and a sector gear 105, in addition to the steering input shaft 101, the sector shaft 105a and the pitman arm 106. The steering output shaft 102 has a bar shape, is equipped with, on the outer peripheral side thereof, a steering-output-shaft-side ball screw groove 102a, and is connected to the steering input shaft 101 via a torsion bar 107. The third nut 103 is equipped with a third nut main body part 103a, a third nut-side ball screw part 103b and a third nut rack tooth part 103c. The third nut main body part 103a has a cylindrical shape, and the steering output shaft 102 is inserted into the third nut main body part 103a. The third nut-side ball screw part 103b is a spiral groove provided on the inner peripheral side of the third nut main body part 103a. The third nut rack tooth part 103c is rack teeth provided on the outer periphery of the third nut main body part 103a.

The third circulating balls 104 are provided between the steering-output-shaft-side ball screw groove 102a and the third nut-side ball screw part 103b, and is capable of transmitting the rotation force of the steering output shaft 102 to the third nut 103. That is, when the steering output shaft 102 rotates, the third circulating balls 104 move while rolling between the steering-output-shaft-side ball screw groove 102a and the third nut-side ball screw part 103b, and the third nut 103 is moved in the direction of a rotation axis R of the steering output shaft 102. The third circulating balls 104 circulate in the inside between the steering-output-shaft-side ball screw groove 102a and the third nut-side ball screw part 103b via a ball tube 108. When the third nut 103 moves in the direction of the rotation axis R of the steering output shaft 102, the sector gear 105 provided so as to mesh with the third nut rack tooth part 103c rotates, and the rotation is transmitted to the sector shaft 105a and the pitman arm 106.

A torque sensor 120 is composed of a magnet 121, a first yoke 122, a second yoke 123 and a magnetic sensor 124. The magnet 121 has an annular shape, and, in the circumferential direction of the rotation axis R of the steering output shaft 102, N poles and S poles are alternately disposed. A pair of an N pole and an S pole or a plurality of N poles and S poles can be used.

The first yoke 122 and the second yoke 123 are provided to the steering input shaft 101, are made of magnetic material, and include an annular portions 122a and 123a and a plurality of claw portions 122b and 123b respectively. A plurality of the claw portions 122b and 123b of the first yoke 122 and the second yoke 123 are disposed so as to be alternately arranged in the circumferential direction of the rotation axis R of the steering input shaft 101, and are provided so as to face the magnet 121. The magnetic sensor 124 is provided between the annular portion 122a of the first yoke 122 and the annular portion 123a of the second yoke 123, and outputs a steering torque signal according to the magnetic field of the place where the magnetic sensor 124 is provided, namely, according to the relative angle between the steering input shaft 101 and the steering output shaft 102 according to the twist amount of the torsion bar 107.

Figure 3:
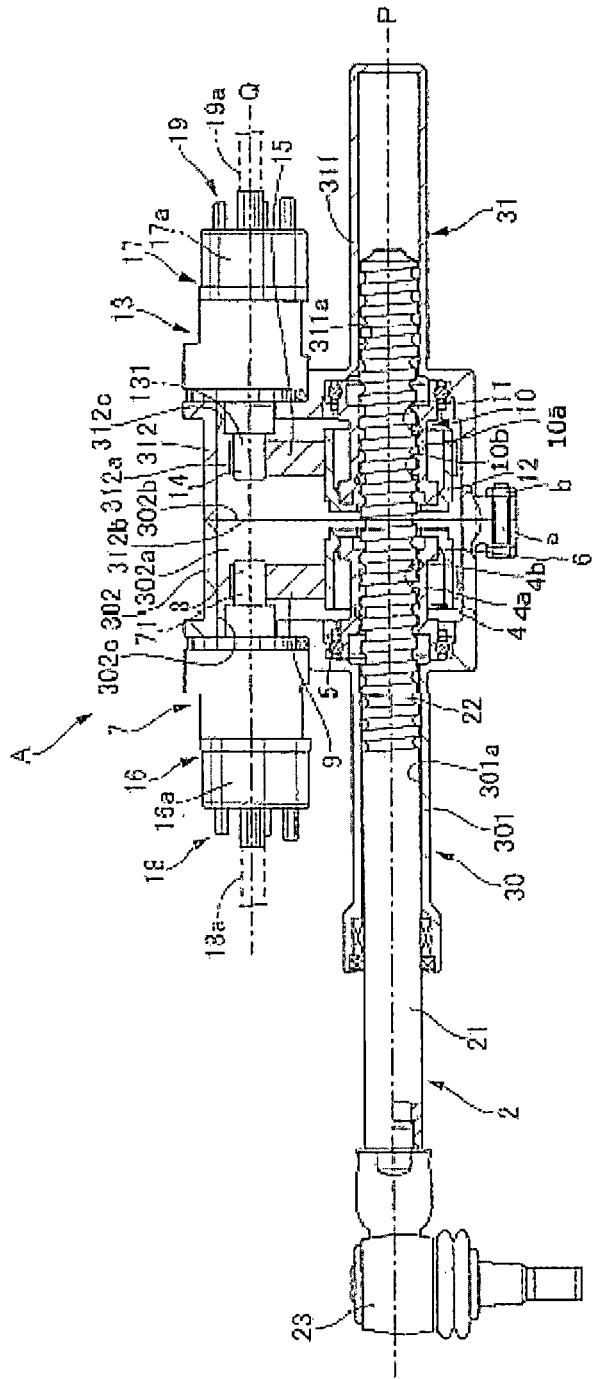
FIG. 3 is a main part sectional view of the steering apparatus of the first embodiment.

FIG. 3 is a main part sectional view of the steering apparatus 1 of the first embodiment. Specifically, it is a sectional view of the assist mechanism A.

The assist mechanism A includes, as a housing, a first housing 30 and a second housing 31. The first housing 30 is equipped with a first steering shaft accommodating part 301 and a second reduction gear accommodating part 302. The first steering shaft accommodating part 301 has a cylindrical shape, and is equipped with a first steering shaft accommodating space 301a accommodating the steering shaft 2 thereinside. The first reduction gear accommodating part 302 has a cylindrical shape, and is equipped with a first reduction gear accommodating space 302a which accommodates thereinside a first nut 4, a first nut pulley 6, a first motor pulley 8 and a first endless belt 9 composing a reduction gear.

The second housing 31 is equipped with a second steering shaft accommodating part 311 and a second reduction gear accommodating part 312. The second steering shaft accommodating part 311 has a cylindrical shape, and is equipped with a second steering shaft accommodating space 311a accommodating the steering shaft 2 thereinside. The second reduction gear accommodating part 312 has a cylindrical shape, and is equipped with a second reduction gear accommodating space 312a which accommodates thereinside a second nut 10, a second nut pulley 12, a second motor pulley 14 and a second endless belt 15 composing a reduction gear.

In addition, the first reduction gear accommodating space 302a is equipped with a first reduction gear accommodating space opening end portion 302b of which the end portion on the side facing the second reduction gear accommodating space 312a is opened, in the direction of the rotation axis Q, and the second reduction gear accommodating space 312a is equipped with a second reduction gear accommodating space opening end portion 312b of which the end portion on the side facing the first reduction gear accommodating space 302a is opened, in the direction of the rotation axis Q. The first reduction gear accommodating space opening end portion 302b and the second reduction gear accommodating space opening end portion 312b are provided so as to come in contact with each other, and the first reduction gear accommodating part 302 and the second reduction gear accommodating part 312 are fixed to each other with a plurality of bolts "a" and nuts "b". With this, by providing the first reduction gear accommodating space opening end portion 302b and the second reduction gear accommodating space opening end portion 312b to the first housing 30 and the second housing 31 respectively, assembly work including winding work of the first endless belt 9 and the second endless belt 15 becomes easy.

Moreover, the first reduction gear accommodating part 302 is equipped with a first motor output shaft insertion hole 302c provided on the side opposite to the first reduction gear accommodating space opening end portion 302b, in the direction of the rotation axis Q. The first motor output shaft 71 is inserted into the first motor output shaft insertion hole 302c from the left side in the drawing, and the first electric motor 7 is fixed to the first reduction gear accommodating part 302. In addition, the second reduction gear accommodating part 312 is equipped with a second motor output shaft insertion hole 312c provided on the side opposite to the second reduction gear accommodating space opening end portion 312b, in the direction of the rotation axis Q. The second motor output shaft 131 is inserted into the second motor output shaft insertion hole 312c from the right side in the drawing, and the second electric motor 13 is fixed to the second reduction gear accommodating part 312. With this, while avoiding the interference between the first electric motor 7 and the second reduction gear accommodating part 312 and the interference between the second electric motor 13 and the first reduction gear accommodating part 302, the first electric motor 7 and the second electric motor 13 can be assembled.

The steering shaft 2 includes a steering shaft main body part 21 and a steering-shaft-side ball screw part 22. The steering shaft main body part 21 has a bar shape, and is capable of steering the right and left steered wheels 3R and 3L by the movement of the steering shaft 2 in the direction of the first axis P. The steering-shaft-side ball screw part 22 is a spiral groove provided on the outer periphery of the steering shaft main body part 21.

The first nut 4 includes a first nut main body part 4a and a first nut-side ball screw groove 4b. The first nut main body part 4a has a cylindrical shape, and the steering shaft 2 is inserted thereinto. The first nut-side ball screw groove 4b is a spiral groove provided on the inner peripheral side of the first nut main body part 4a. First circulating balls 5 are provided between the steering-shaft-side ball screw part 22 and a first nut-side ball screw groove 42 so as to transmit the rotation force of the first nut 4 to the steering shaft 2. The first nut pulley 6 is provided so as to rotate integrally with the first nut 4.

The rotation axis Q of the first motor output shaft 71 is arranged so as to be offset to the first axis P. The first motor pulley 8 is provided so as to rotate integrally with the first motor output shaft 71. The first endless belt 9 is wound between the first nut pulley 6 and the first motor pulley 8. In this way, the rotation force of the first electric motor 7 is transmitted to the first nut 4 via the first motor pulley 8, the first endless belt 9 and the first nut pulley 6 composing a speed reduction mechanism.

The second nut 10 includes a second nut main body part 10a and a second nut-side ball screw groove 10b. The second nut main body part 10a has a cylindrical shape, and the steering shaft 2 is inserted thereinto. The second nut-side ball screw groove 10b is a spiral groove provided on the inner peripheral side of the second nut main body part 10a. Second circulating balls 11 are provided between the steering-shaft-side ball screw part 22 and the second nut-side ball screw groove 10b so as to transmit the rotation force of the second nut 10 to the steering shaft 2. The second nut pulley 12 is provided so as to rotate integrally with the second nut 10. In addition, a part of the region of the steering-shaft-side ball screw part 22 is formed by communalizing the region in which the first circulating balls 5 circulate and the region in which the second circulating balls 11 circulate. With this, both of the first circulating balls 5 and the second circulating balls 11 are able to circulate in a part of the region of the steering-shaft-side ball screw part 22, and thereby the forming region of the steering-shaft-side ball screw part 22 can be small and the forming of the steering-shaft-side ball screw part 22 becomes easy Here, in the steering-shaft-side ball screw part 22, the region in which the first circulating balls 5 circulate may be formed separately from the region in which the second circulating balls 11 circulate.

The rotation axis Q of the second motor output shaft 131 is arranged so as to be offset to the first axis P. The second motor pulley 14 is provided so as to rotate integrally with the second motor output shaft 131. The second endless belt 15 is wound between the second nut pulley 12 and the second motor pulley 14. In this way, the rotation force of the second electric motor 13 is transmitted to the second nut 10 via the second motor pulley 14, the second endless belt 15 and the second nut pulley 12 composing a speed reduction mechanism.

That is, in the direction of the rotation axis Q, the first electric motor 7, the first motor pulley 8, the second motor pulley 14 and the second electric motor 13 are provided so as to be arranged in this order. With this, when a first system electric actuator composed of the first nut 4 and the first electric motor 7 and a second system electric actuator composed of the second nut 10 and the second electric motor 13 are provided to the common steering shaft 2, in the first axis P, the first nut 4 and the second nut 10 can be arranged so as to be adjacent to each other, and thereby the sizes of the peripheries of the first nut 4 and the second nut 10 (sizes including housings for accommodating the first nut 4 and the second nut 10) can be reduced.

In addition, as mentioned above, the assist mechanism A includes the first ECU 16 of the first electric motor 7 which has a first microprocessor 16a disposed on the side opposite to the second electric motor 13 side (left side in the drawing), the first connector 18 to which the first power supply wiring 18a can be connected, the second ECU 17 of the second electric motor 13 which has a second microprocessor 17a disposed on the side opposite to the first electric motor 7 side (right side in the drawing), and the second connector 19 to which the second power supply wiring 19a can be connected. The first microprocessor 16a of the first ECU 16 outputs a first command signal for driving and controlling the first electric motor 7 based on a steering torque signal from the torque sensor 120, and the second microprocessor 17a of the second ECU 17 outputs a second command signal for driving and controlling the second electric motor 13 based on a steering torque signal from the torque sensor 120. That is, in the direction of the rotation axis Q, from the left direction in the drawing, the first ECU 16, the first electric motor 7, the first motor pulley 8, the second motor pulley 14, the second electric motor 13 and the second ECU 17 are disposed so as to be arranged in this order. With this, the first ECU 16 and the second ECU 17 can be disposed so as to be adjacent to the first electric motor 7 and the second electric motor 13 respectively, and the size of the steering apparatus can be suppressed from being increased. In addition, since the control for the first and second electric motors 7 and 13 is carried out based on the steering torque signals, a steering burden of a driver can be reduced.

Next, working effects will be explained. In the steering apparatus of the first embodiment, the following working effects are obtained.

(1) In the direction of the rotation axis Q, the first electric motor 7, the first motor pulley 8, the second motor pulley 14 and the second electric motor 13 are provided so as to be arranged in this order. Consequently, when a first system electric actuator composed of the first nut 4 and the first electric motor 7 and a second system electric actuator composed of the second nut 10 and the second electric motor 13 are provided to the common steering shaft 2, in the first axis P, the first nut 4 and the second nut 10 can be disposed so as to be adjacent to each other, and thereby the sizes of the peripheries of the first nut 4 and the second nut 10 (sizes including housings for accommodating the first nut 4 and the second nut 10) can be reduced.

(2) In the direction of the rotation axis Q, from the left direction of the drawing, the first ECU 16, the first electric motor 7, the first motor pulley 8, the second motor pulley 14, the second electric motor 13 and the second ECU 17 are disposed so as to be arranged in this order. Consequently, the first ECU 16 and the second ECU 17 can be disposed so as to be adjacent to the first electric motor 7 and the second electric motor 13 respectively, and thereby the size of the steering apparatus can be suppressed from being increased.

(3) In the direction of the rotation axis Q, the first connector 18, the first ECU 16, the first electric motor 7, the first motor pulley 8, the second motor pulley 14, the second electric motor 13, the second ECU 17 and the second connector 19 are disposed so as to be arranged in this order. Consequently, it becomes possible to extend the first power supply wiring 18a and the second power supply wiring 19a to the outside from the first ECU 16 and the second ECU 17, and thereby the wiring of the first power supply wiring 18a and the second power supply wiring 19a becomes easy (4) A part of the region of the steering-shaft-side ball screw part 22 is formed such that the region in which the first circulating balls 5 circulate and the region in which the second circulating balls 11 circulate are communalized. Consequently, both of the first circulating balls 5 and the second circulating balls 11 are able to circulate in a part of the region of the steering-shaft-side ball screw part 22, and thereby the forming region of the steering-shaft-side ball screw part 22 can be small and the forming of the groove of the steering-shaft-side ball screw part 22 becomes easy.

(5) The first reduction gear accommodating space 302a is equipped with the first reduction gear accommodating space opening end portion 302b of which the end portion on the side facing the second reduction gear accommodating space 312a is opened, in the direction of the rotation axis Q of the first motor output shaft 71, and the second reduction gear accommodating space 312a is equipped with the second reduction gear accommodating space opening end portion 312b of which the end portion on the side facing the first reduction gear accommodating space 302a is opened, in the direction of the rotation axis Q of the second motor output shaft 131. The first reduction gear accommodating space opening end portion 302b and the second reduction gear accommodating space opening end portion 312b are provided so as to come in contact with each other, and the first reduction gear accommodating part 302 and the second reduction gear accommodating part 312 are fixed to each other with a plurality of the bolts "a" and the nuts "b". Consequently, by providing the first reduction gear accommodating space opening end portion 302b and the second reduction gear accommodating space opening end portion 312b to the first housing 30 and the second housing 31 respectively, assembly work including winding work of the first endless belt 9 and the second endless belt 15 becomes easy.

(6) The first reduction gear accommodating part 302 is equipped with the first motor output shaft insertion hole 302c provided on the side opposite to the first reduction gear accommodating space opening end portion 302b, in the direction of the rotation axis Q, the first motor output shaft 71 is inserted into the first motor output shaft insertion hole 302c, and the first electric motor 7 is fixed to the first reduction gear accommodating part 302. The second reduction gear accommodating part 312 is equipped with the second motor output shaft insertion hole 312c provided on the side opposite to the second reduction gear accommodating space opening end portion 312b, in the direction of the rotation axis Q, the second motor output shaft 131 is inserted into the second motor output shaft insertion hole 312c, and the second electric motor 13 is fixed to the second reduction gear accommodating part 312. Consequently, while avoiding the interference between the first electric motor 7 and the second reduction gear accommodating part 312 and the interference between the second electric motor 13 and the first reduction gear accommodating part 302, the first electric motor 7 and the second electric motor 13 can be assembled.

(7) The steering input shaft 101 of the steering mechanism 100 is mechanically connected to the steering wheel 200, the steering shaft 2 of the assist mechanism A and the right and left steered wheels 3R and 3L, such that the rotation force of the steering wheel 200 is transmitted in the order of the steering wheel 200, the steering input shaft 101, the steering shaft 2 and the right and left steered wheels 3R and 3L. Consequently, by interposing the steering shaft 2 of the assist mechanism A to the middle of the steering system from the steering wheel 200 to the right and left steered wheels 3R and 3L, steering control can be carried out while using the layout of the existing steering system.

(8) The steering mechanism 100 includes the steering input shaft 101, the steering output shaft 102, the third nut 103, the third circulating balls 104, the sector gear 105, the sector shaft 105a and the pitman arm 106, and an end portion of the steering shaft 2 is connected to, via the ball joint 23, the middle part of the pitman arm 106 provided between the sector gear 105 and the right and left steered wheels 3R and 3L. Consequently, mountability to vehicles, such as trucks and busses, each mounting a steering apparatus having a ball-nut type steering mechanism is enhanced.

(9) The torque sensor 120 outputs a steering torque signal according to the relative angle between the steering input shaft 101 and the steering output shaft 102 according to the twist amount of the torsion bar 107 connecting the steering input shaft 101 and the steering output shaft 102, the first microprocessor 16a of the first ECU 16 outputs a first command signal for driving and controlling the first electric motor 7 based on a steering torque signal from the torque sensor 120, and the second microprocessor 17a of the second ECU 17 outputs a second command signal for driving and controlling the second electric motor 13 based on a steering torque signal from the torque sensor 120. Consequently, since the control for the first and second electric motors 7 and 13 according to the steering torque signals is carried out, a steering burden of a driver can be reduced.

Second Embodiment

Figure 4:
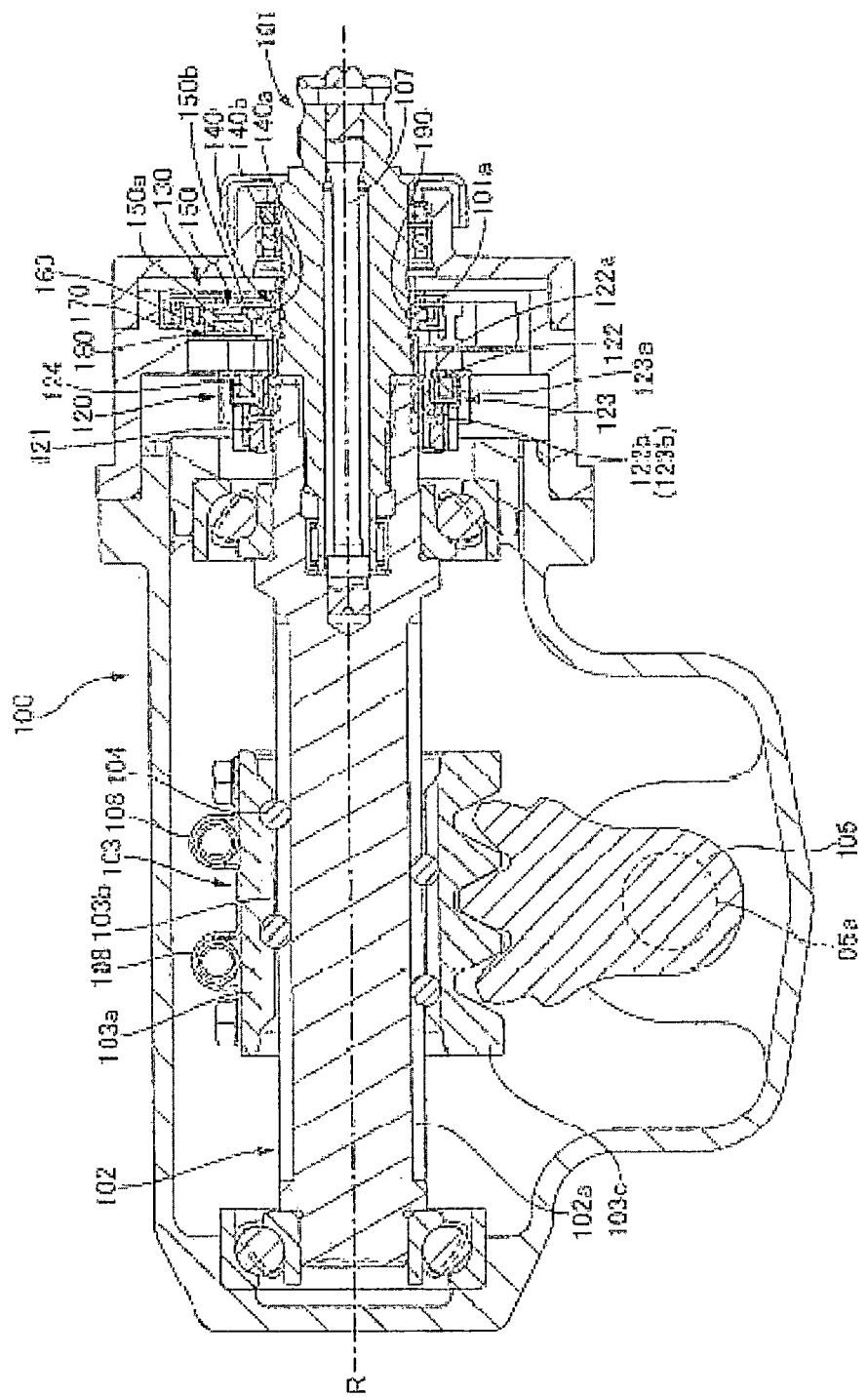
FIG. 4 is a sectional view of the steering mechanism of a second embodiment.

FIG. 4 is a sectional view of a steering mechanism 100 of a second embodiment.

Different from the first embodiment, in addition to the torque sensor 120, a steering angle sensor 130 is further provided. That is, the steering angle sensor 130 is equipped with an input gear 140, a first gear 150, a second gear which is not shown in the drawing, a first rotation sensor 170, a second rotation sensor which is not shown in the drawing, and a sensor board 180. The input gear 140 is a relatively large first external gear. The input gear 140 includes a main body part 140a and a shaft part 140b. The main body part 140a includes, on the outer periphery thereof, a plurality of teeth (forty teeth). The shaft part 140b has a cylindrical shape, protrudes on the both sides of the axis of the main body part 140a, and extends to the direction of the rotation axis R of the input gear 140. The input gear 140 is located at the outer periphery of the steering input shaft 101. A groove 101a extending in the circumferential direction of the rotation axis R of the steering input shaft 101 is formed on the outer periphery of the steering input shaft 101. An O-ring 190 is provided to the groove 101a. In a state in which the input gear 140 is attached to the steering input shaft 101, the outer periphery of the O-ring 190 comes in tightly contact with the inner periphery of the shaft part 140b of the input gear 140, and the O-ring 190 is compressively deformed. By the friction between the O-ring 190 and the shaft part 140b, the input gear 140 rotates integrally with the steering input shaft 101.

The first gear 150 is a relatively small second external gear. The first gear 150 includes a main body part 150a and a shaft part 150b. The main body part 150a includes, on the outer periphery thereof, a plurality of teeth. The number of the teeth of the first gear 150 is twenty. The shaft part 150b has a cylindrical shape having a bottom, protrudes from the main body part 150a, and extends to one side in the rotation axial direction of the first gear 150. A magnetic member 160 is attached to the inside of the shaft part 150b. An N pole and an S pole are magnetically attached to the magnetic member 160 so as to be arranged in parallel in the circumferential direction of the rotation axis of the first gear 150. In addition, one pair of an N pole and an S pole or two pairs of N poles and S poles may be used. The second gear which is not shown in the drawing is a relatively small third external gear. The number of the teeth of the second gear is twenty-two. Another configuration of the second gear is the same as that of the first gear 150. The first gear 150 meshes with the input gear 140, and the second gear meshes with the first gear 150.

The first gear 150, the magnetic member 160 of the second gear and the like face the sensor board 180. The sensor board 180 includes the first rotation sensor 170 facing the first gear 150 and the second rotation sensor facing the second gear which is not shown in the drawing. Each of the rotation sensors such as the rotation sensor 170 is a magnetoresistive effect sensor, and is equipped with a magnetoresistive effect element (MR element). Each of the rotation sensors such as the rotation sensor 170 detects, as a variation in the resistance value of the element, a variation in the magnetic field generated between N poles and S poles of the magnetic member 160 and the like. The first rotation sensor 170 detects the rotation angle of the first gear 150. Specifically, the first rotation sensor 170 outputs, as an electric signal (sinusoidal signal of voltage), a variation in magnetic resistance which varies according to the rotation position of the first gear 150. Similarly, the second rotation sensor detects the rotation angle of the second gear, and outputs it as an electric signal. Since the number of the teeth of the first gear 150 and the number of the teeth of the second gear are not dividable each other, by the combination of the detected value of the first rotation sensor 170 and the detected value of the second rotation sensor, the rotation angle of the steering input shaft 101 can be detected even when exceeding 360 degrees. Consequently, the control for the first electric motor 7 and the second electric motor 13 can be carried out according to a steering angle signal, and thereby it is possible to cope with vehicle control such as an automatic operation based on a target steering angle. Since the other configuration is the same as that of the first embodiment, the same symbols as those of the first embodiment are applied to the components which are common to those of the first embodiment, and redundant explanation is omitted.

Next, a working effect will be explained. In the steering apparatus of the second embodiment, in addition to the working effects of the first embodiment, the following working effect is obtained.

(1) The control for the first electric motor 7 and the second electric motor 13 can be carried out according to a steering angle signal from the steering angle sensor 130. Consequently, it is possible to cope with vehicle control such as an automatic operation based on a target steering angle.

Third Embodiment

Figure 5:
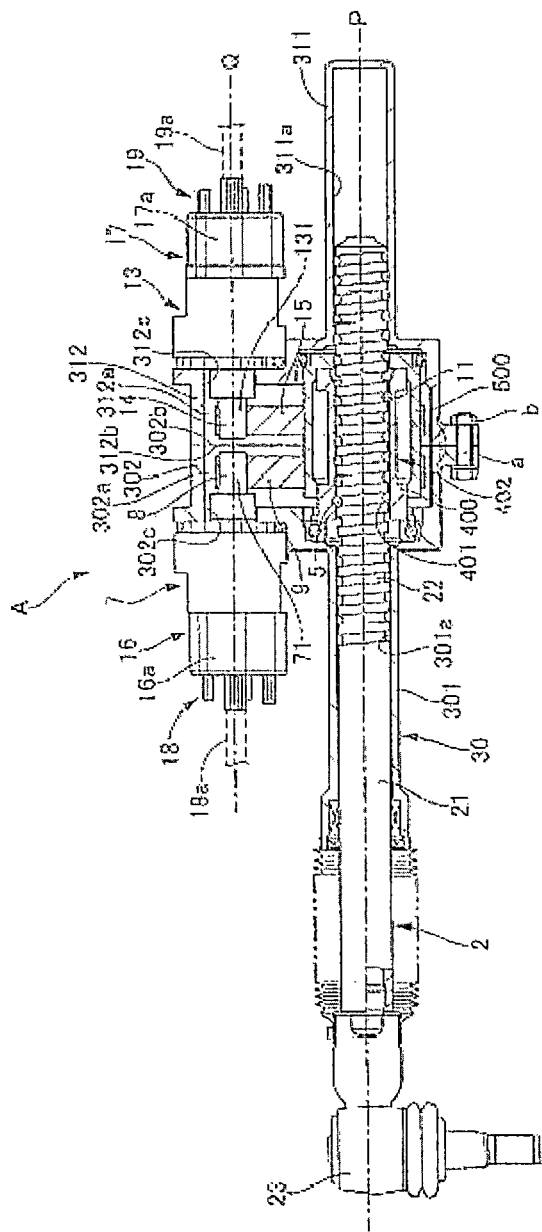
FIG. 5 is a main part sectional view of the steering apparatus of a third embodiment.

FIG. 5 is a main part sectional view of the steering apparatus 1 of a third embodiment. Specifically, it is a sectional view of the assist mechanism A.

Different from the first embodiment 1, the first nut 4 and the second nut 10 of the first embodiment are integrally formed as a nut 400, and the first nut pulley 6 and the second nut pulley 12 of the first embodiment are integrally formed as a nut pulley 500. The nut 400 includes a nut main body part 401 and a nut-side ball screw groove 402. Consequently, the numbers and the sizes of the parts of the nut and pulleys can be reduced. Since the other configuration is the same as that of the first embodiment, the same symbols as those of the first embodiment are applied to the components which are common to those of the first embodiment, and redundant explanation is omitted.

Next, a working effect will be explained. In the steering apparatus of the third embodiment, in addition to the working effects of the first embodiment, the following working effect is obtained.

(1) The nut 400 is formed by integrally forming the first nut 4 and the second nut 10, and the nut pulley 500 is formed by integrally forming the first nut pulley 6 and the second nut pulley 12. Consequently, the numbers and the sizes of the parts of the nut and the pulleys can be reduced.

Fourth Embodiment

Figure 6:
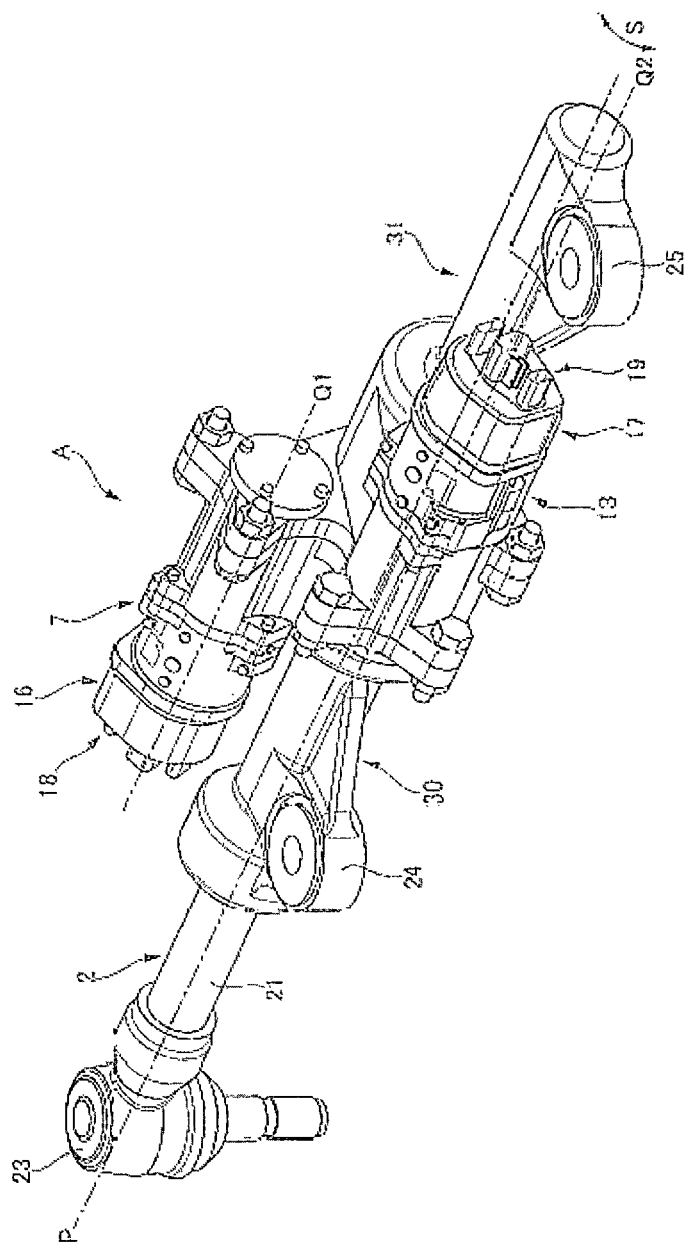
FIG. 6 is a main part perspective view of the steering apparatus of a fourth embodiment.

FIG. 6 is a main part perspective view of the steering apparatus 1 of a fourth embodiment. Specifically, it is a main part perspective view of the assist mechanism A.

Although, in the first embodiment, the rotation axis Q of the first motor output shaft 71 of the first electric motor 7 and the rotation axis Q of the second motor output shaft 131 of the second electric motor 13 are coaxially arranged, different from the first embodiment, the first electric motor 7 and the second electric motor 13 are disposed such that a rotation axis Q1 of the first motor output shaft 71 of the first electric motor 7 and a rotation axis Q2 of the second motor output shaft 131 of the second electric motor 13 are offset (in the direction shown by an arrow S) so as to be separated from each other, in a cross section orthogonal to the first axis P. By disposing the first electric motor 7 and the second electric motor 13 in this way, the pulling directions of the first and second endless belts 9 and 15 via the first and second nut pulleys 6 and 12 are different from each other between the first nut 4 and the second nut 10, and thereby the first nut 4 and the second nut 10 can be suppressed from being inclined when the first nut 4 and the second nut 10 are viewed as an integral part. Since the other configuration is the same as that of the first embodiment, the same symbols as those of the first embodiment are applied to the components which are common to those of the first embodiment, and redundant explanation is omitted.

Next, a working affect will be explained. In the steering apparatus of the fourth embodiment, in addition to the working effects of the first embodiment, the following effect is obtained.

(1) The first electric motor 7 and the second electric motor 13 are disposed such that the rotation axis Q1 of the first motor output shaft 71 of the first electric motor 7 and the rotation axis Q2 of the second motor output shaft 131 of the second electric motor 13 are offset (in the direction shown by the arrow S) so as to be separated from each other, in a cross section orthogonal to the first axis P. Consequently, the pulling directions of the first and second endless belts 9 and 15 via the first and second nut pulleys 6 and 12 are different from each other between the first nut 4 and the second nut 10, and thereby the first nut 4 and the second nut 10 can be suppressed from being inclined when the first nut 4 and the second nut 10 are viewed as an integral part.

Fifth Embodiment

Figure 7:
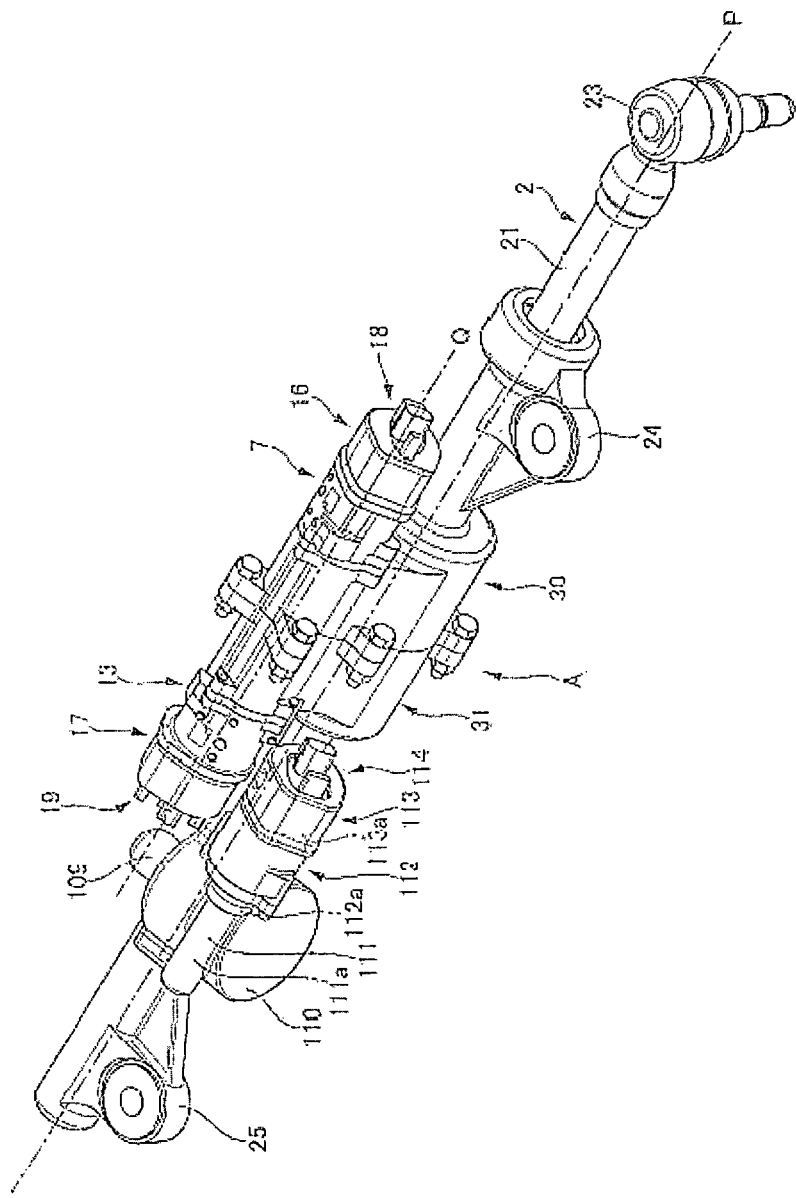
FIG. 7 is a main part perspective view of the steering apparatus of a fifth embodiment.
Figure 8:
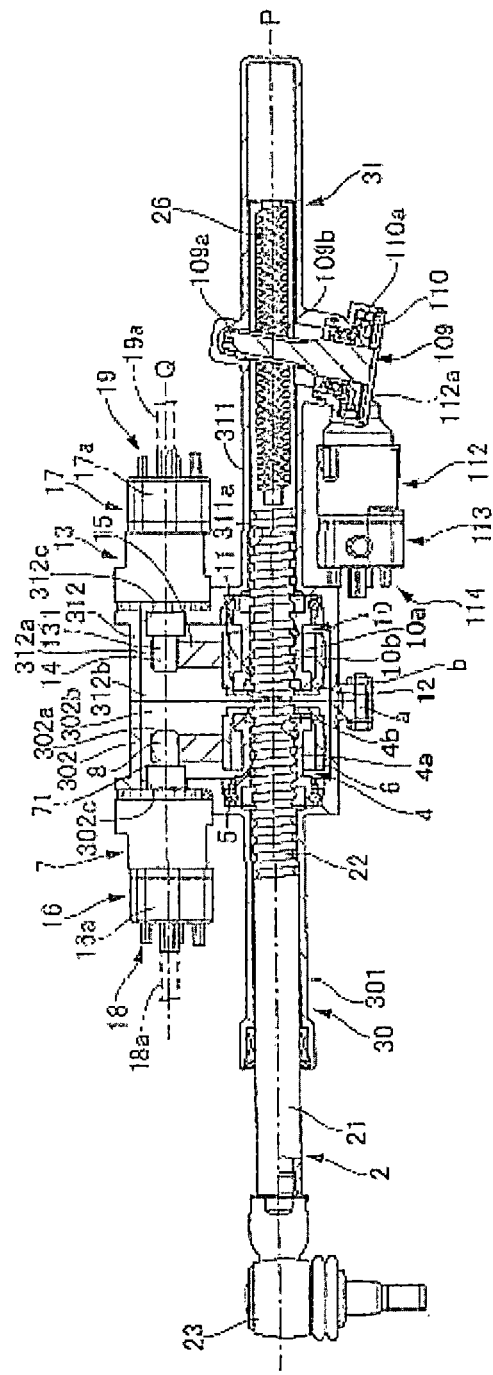
FIG. 8 is a main part sectional view of the steering apparatus of the fifth embodiment.

FIG. 7 is a main part perspective view of the steering apparatus 1 of a fifth embodiment, and FIG. 8 is a main part sectional view of the steering apparatus 1 of the fifth embodiment. Specifically, FIG. 7 and FIG. 8 are a main part perspective view and a main part sectional view of the assist mechanism A.

Different from the first embodiment, the steering apparatus 1 is equipped with, in addition to the first electric motor 7 and the second electric motor 13, a third electric motor 112 including a third ECU 113 having a third microprocessor 113a and a third connector 114 to which a power supply wiring can be connected, a pinion shaft 109, a worm shaft 111 and a worm wheel 110 composing a worm gear as a speed reduction mechanism. The steering shaft 2 is equipped with a steering shaft rack tooth part 26 provided on the outer periphery of the steering shaft main body part 21. The pinion shaft 109 is equipped with a pinion shaft main body part 109a and a pinion tooth part 109b. The pinion shaft main body part 109a has a bar shape, and the pinion tooth part 109b is provided on the outer peripheral side of the pinion shaft main body part 109a so as to mesh with the steering shaft rack tooth part 26. The worm wheel 110 is provided so as to rotate integrally with the pinion shaft 109, and is equipped with a worm wheel tooth part 110a, The worm shaft 111 is equipped with a worm shaft tooth part 111a which meshes with the worm wheel tooth part 110a. The third electric motor 112 includes a third motor output shaft 112a rotatably integrally connected to the worm shaft 111. That is, the rotation force of the third electric motor 112 is transmitted to the pinion shaft 109 via the worm gear composed of the worm wheel 110 and the worm shaft 111, and then the steering shaft 2 moves in the direction of the first axis P via the steering shaft rack tooth part 26 meshing with the pinion tooth part 109b. In this way, in addition to the first electric motor 7 and the second electric motor 13, the third electric motor 112 is provided, and thereby it is possible to cope with the failure of the first motor 7 and the second motor 13 or an effect such as further improvement of the output of assist force can be obtained. In addition, the configuration of the speed reduction mechanism is formed as a worm gear different from those on the first electric motor 7 side and the second electric motor 13 side, thereby obtaining a configuration that is strong against a common cause failure. Moreover, the driving configuration is formed to have a rack and pinion type which is different from those of the first electric motor 7 side and the second electric motor 13 side, and thereby even in a case where the driving of the first electric motor 7 and the second electric motor 13 is difficult due to, for example, the rust of the steering-shaft-side ball screw part 22, via the rack and pinion which hardly receives that influence, the steering control can be continued by the third electric motor 112 and the rotation regulation of the steering shaft 2 can be carried out.

Next, working effects will be explained. In the steering apparatus of the fifth embodiment, in addition to the working effects of the first embodiment, the following working effects are obtained.

(1) In addition to the first electric motor 7 and the second electric motor 13, the third electric motor 112 is provided. Consequently, it is possible to cope with the failure of the first electric motor 7 and the second electric motor 13, or an effect such as further improvement of the output of assist force can be obtained.

(2) The configuration of the speed reduction mechanism is formed as a worm gear different from those on the first electric motor 7 side and the second electric motor 13 side. Consequently, a configuration that is strong against a common cause failure can be obtained.

(3) The driving configuration is formed to have a rack and pinion type which is different from those of the first electric motor 7 side and the second electric motor 13 side. Consequently, even in a case where the driving of the first electric motor 7 and the second electric motor 13 is difficult due to, for example, the rust of the steering-shaft-side ball screw part 22, via the rack and pinion which hardly receives that influence, the steering control can be continued by the third electric motor 112 and the rotation regulation of the steering shaft 2 can be carried out.

Another Embodiment

As the above, although the embodiments for implementing the present invention have been explained, a specific configuration of the present invention is not limited to those of the embodiments, and even if design change within the scope and spirit of the invention is carried out, it is included in the present invention.

Technical ideas that can be grasped from the embodiments explained above will be described below.

A steering apparatus, in one aspect thereof, includes: a steering shaft including a steering shaft main body part and a steering-shaft-side ball screw part, wherein the steering shaft main body part has a bar shape, and is capable of steering steered wheels by a movement of the steering shaft in a longitudinal direction of the steering shaft main body part, and wherein the steering-shaft-side ball screw part is a spiral groove provided on an outer periphery of the steering shaft main body part; a first nut including a first nut main body part and a first nut-side ball screw part, wherein the first nut main body part has a cylindrical shape and the steering shaft is inserted into the first nut main body part, and wherein the first nut-side ball screw part is a spiral groove provided on an inner peripheral side of the first nut main body part; a first circulating ball provided between the steering-shaft-side ball screw part and the first nut-side ball screw part so as to transmit a rotation force of the first nut to the steering shaft; a first nut pulley capable of rotating integrally with the first nut; a first electric motor including a first motor output shaft, wherein when an axis passing through a center of the steering shaft in a cross section orthogonal to a longitudinal direction of the steering shaft and arranged parallel to the longitudinal direction of the steering shaft is set as a first axis, the first motor output shaft is disposed such that a rotation axis of the first motor output shaft is offset to the first axis; a first motor pulley capable of rotating integrally with the first motor output shaft; a first endless belt wound between the first nut pulley and the first motor pulley; a second nut including a second nut main body part and a second nut-side ball screw part, wherein the second nut main body part has a cylindrical shape and is disposed so as to be offset to the first nut in a direction of the first axis, and the steering shaft is inserted into the second nut main body part, and wherein the second nut-side ball screw part is a spiral groove provided on an inner peripheral side of the second nut main body part; a second circulating ball provided between the steering-shaft-side ball screw part and the second nut-side ball screw part so as to transmit a rotation force of the second nut to the steering shaft; a second nut pulley capable of rotating integrally with the second nut; a second electric motor including a second motor output shaft, wherein the second motor output shaft is disposed such that a rotation axis of the second motor output shaft is offset to the first axis; a second motor pulley capable of rotating integrally with the second motor output shaft, and provided such that, in a direction of the rotation axis of the first motor output shaft, the first electric motor, the first motor pulley, the second motor pulley and the second electric motor are arranged in this order; and a second endless belt wound between the second nut pulley and the second motor pulley.

In a more preferable aspect, in the above aspect, the steering apparatus further includes a first ECU and a second ECU, wherein the first ECU and the second ECU are provided such that, in the direction of the rotation axis of the first motor output shaft, the first ECU, the first electric motor, the first motor pulley, the second motor pulley, the second electric motor and the second ECU are arranged in this order, wherein the first ECU includes a first microprocessor, and the first microprocessor outputs a first command signal for driving and controlling the first electric motor, and wherein the second ECU includes a second microprocessor, and the second microprocessor outputs a second command signal for driving and controlling the second electric motor.

In a more preferable aspect, in the above aspect, the steering apparatus further includes a first connector and a second connector, wherein the first connector and the second connector are disposed such that, in the direction of the rotation axis of the first motor output shaft, the first connector, the first ECU, the first electric motor, the first motor pulley, the second motor pulley, the second electric motor, the second ECU and the second connector are arranged in this order, and wherein a first power supply wiring for supplying power to the first ECU can be connected to the first connector, and a second power supply wiring for supplying power to the second ECU can be connected to the second connector.

In another preferable aspect, in any of the above aspects, both of the first circulating ball and the second circulating ball can be circulated in a part of a region of the steering-shaft-side ball screw part.

In another preferable aspect, in any of the above aspects, the first nut is formed integrally with the second nut.

In a more preferable aspect, in the above aspect, the first electric motor and the second electric motor are disposed such that, in a cross section orthogonal to the first axis, the rotation axis of the first motor output shaft and the rotation axis of the second motor output shaft are arranged apart from each other.

In yet another preferable aspect, in any of the above aspects, the steering apparatus further includes a first housing and a second housing, wherein the first housing is equipped with a first steering shaft accommodating part and a first reduction gear accommodating part, wherein the first steering shaft accommodating part has a cylindrical shape, and is equipped with, on an inner side thereof, a first steering shaft accommodating space into which the steering shaft is accommodated, wherein the first reduction gear accommodating part has a cylindrical shape, and is equipped with, on an inner side thereof, a first reduction gear accommodating space accommodating the first nut, the first nut pulley, the first motor pulley and the first endless belt, wherein the second housing is equipped with a second steering shaft accommodating part and a second reduction gear accommodating part, wherein the second steering shaft accommodating part has a cylindrical shape, and is equipped with, on an inner side thereof, a second steering shaft accommodating space into which the steering shaft is accommodated, wherein the second reduction gear accommodating part has a cylindrical shape, and is equipped with, on an inner side thereof, a second reduction gear accommodating space accommodating the second nut, the second nut pulley, the second motor pulley and the second endless belt, wherein the first reduction gear accommodating space is equipped with a first reduction gear accommodating space opening end portion of which an end portion on a side facing the second reduction gear accommodating space is opened, in the direction of the rotation axis of the first motor output shaft, wherein the second reduction gear accommodating space is equipped with a second reduction gear accommodating space opening end portion of which an end portion on a side facing the first reduction gear accommodating space is opened, in a direction of the rotation axis of the second motor output shaft, and wherein the first reduction gear accommodating space opening end portion and the second reduction gear accommodating space opening end portion are provided so as to come in contact with each other.

In a more preferable aspect, in the above aspect, the first reduction gear accommodating part is equipped with a first motor output shaft insertion hole provided on an opposite side of the first reduction gear accommodating space opening end portion, in the direction of the rotation axis of the first motor output shaft, the first motor output shaft is inserted into the first reduction gear accommodating space through the first motor output shaft insertion hole, in the direction of the rotation axis of the first motor output shaft, the second reduction gear accommodating part is equipped with a second motor output shaft insertion hole provided on an opposite side of the second reduction gear accommodating space opening end portion, in the direction of the rotation axis of the second motor output shaft, and the second motor output shaft is inserted into the second reduction gear accommodating space through the second motor output shaft insertion hole, in the direction of the rotation axis of the second motor output shaft.

In yet another preferable aspect, in any of the above aspects, the steering mechanism includes a steering input shaft, and the steering input shaft is mechanically connected to a steering wheel and the steered wheels, and is provided such that a rotation force of the steering wheel is transmitted in an order of the steering wheel, the steering input shaft, the steering shaft and the steered wheels.

In a more preferable aspect, in the above aspect, the steering mechanism further includes a steering output shaft, a third nut, a third circulating ball, a sector gear and a pitman arm, the steering output shaft has a bar shape, is equipped with, on an outer peripheral side thereof, a steering-output-shaft-side ball screw groove, and is connected to the steering input shaft, the third nut includes a third nut main body part, a third nut-side ball screw part and a third nut rack tooth part, the third nut main body part has a cylindrical shape, and the steering output shaft is inserted into the third nut main body part, the third nut-side ball screw part is a spiral groove provided on an inner peripheral side of the third nut main body part, the third nut rack tooth part is rack teeth provided on an outer peripheral side of the third nut main body part, the third circulating ball is provided between the steering-output-shaft-side ball screw groove and the third nut-side ball screw part, so as to transmit a rotation force of the steering output shaft to the third nut, the sector gear is provided so as to mesh with the third nut rack tooth part so as to be rotatable with movement of the third nut, the pitman arm is provided between the sector gear and the steered wheels so as to steer the steered wheels with rotation of the sector gear, and the steering shaft is connected between the sector gear and the steered wheels in the steering mechanism.

In yet another preferable aspect, in any of the above aspects, the steering mechanism includes a steering output shaft, a torsion bar and a torque sensor, the steering output shaft is connected to the steering input shaft via the torsion bar, the torque sensor is capable of outputting a steering torque signal according to a relative angle between the steering input shaft and the steering output shaft according to a twist amount of the torsion bar, and the first electric motor and the second electric motor are driven and controlled according to a motor command signal according to the steering torque signal.

In yet another preferable aspect, in any of the above aspects, the steering apparatus further includes a steering angle sensor, the steering angle sensor is provided to the steering input shaft, and is capable of outputting a steering angle signal according to a steering angle of the steered wheels, based on a rotation amount of the steering input shaft, and the first electric motor and the second electric motor are driven and controlled according to a motor command signal according to the steering angle signal.

In yet another preferable aspect, in any of the above aspects, the steering apparatus further includes a pinion shaft, a worm wheel, a worm shaft and a third electric motor, wherein the steering shaft is equipped with a steering shaft rack tooth part provided on an outer periphery of the steering shaft main body part, wherein the pinion shaft includes a pinion shaft main body part and a pinion tooth part, wherein the pinion shaft main body part has a bar shape, wherein the pinion tooth part is provided on an outer peripheral side of the pinion shaft main body part, so as to mesh with the steering shaft rack tooth part, wherein the worm wheel is provided rotatably integrally with the pinion shaft, and is equipped with a worm wheel tooth part, wherein the worm shaft is equipped with a worm shaft tooth part which meshes with the worm wheel tooth part, and wherein the third electric motor includes a third motor output shaft connected to the worm shaft.

The invention claimed is:
1. A steering apparatus comprising:
a steering shaft including a steering shaft main body part and a steering-shaft-side ball screw part, wherein the steering shaft main body part has a bar shape, and is capable of steering steered wheels by a movement of the steering shaft in a longitudinal direction of the steering shaft main body part, and wherein the steering-shaft-side ball screw part is a spiral groove provided on an outer periphery of the steering shaft main body part;
a first nut including a first nut main body part and a first nut-side ball screw part, wherein the first nut main body part has a cylindrical shape and the steering shaft is inserted into the first nut main body part, and wherein the first nut-side ball screw part is a spiral groove provided on an inner peripheral side of the first nut main body part;
a first circulating ball provided between the steering-shaft-side ball screw part and the first nut-side ball screw part so as to transmit a rotation force of the first nut to the steering shaft;
a first nut pulley capable of rotating integrally with the first nut;
a first electric motor including a first motor output shaft, wherein when an axis passing through a center of the steering shaft in a cross section orthogonal to a longitudinal direction of the steering shaft and arranged parallel to the longitudinal direction of the steering shaft is set as a first axis, the first motor output shaft is disposed such that a rotation axis of the first motor output shaft is offset to the first axis;
a first motor pulley capable of rotating integrally with the first motor output shaft;
a first endless belt wound between the first nut pulley and the first motor pulley;
a second nut including a second nut main body part and a second nut-side ball screw part, wherein the second nut main body part has a cylindrical shape and is disposed so as to be offset to the first nut in a direction of the first axis, and the steering shaft is inserted into the second nut main body part, and wherein the second nut-side ball screw part is a spiral groove provided on an inner peripheral side of the second nut main body part;
a second circulating ball provided between the steering-shaft-side ball screw part and the second nut-side ball screw part so as to transmit a rotation force of the second nut to the steering shaft;
a second nut pulley capable of rotating integrally with the second nut;
a second electric motor including a second motor output shaft, wherein the second motor output shaft is disposed such that a rotation axis of the second motor output shaft is offset to the first axis;
a second motor pulley capable of rotating integrally with the second motor output shaft, and provided such that, in a direction of the rotation axis of the first motor output shaft, the first electric motor, the first motor pulley, the second motor pulley and the second electric motor are arranged in this order;

a second endless belt wound between the second nut pulley and the second motor pulley; and
a steering mechanism,
wherein the steering mechanism includes a steering input shaft,
wherein the steering input shaft is mechanically connected to a steering wheel and the steered wheels, and is provided such that a rotation force of the steering wheel is transmitted in an order of the steering wheel, the steering input shaft, the steering shaft and the steered wheels,
wherein the steering mechanism includes a steering output shaft, a third nut, a third circulating ball, a sector gear and a pitman arm,
wherein the steering output shaft has a bar shape, is equipped with, on an outer peripheral side thereof, a steering-output-shaft-side ball screw groove, and is connected to the steering input shaft,
wherein the third nut includes a third nut main body part, a third nut-side ball screw part and a third nut rack tooth part,
wherein the third nut main body part has a cylindrical shape, and the steering output shaft is inserted into the third nut main body part,
wherein the third nut-side ball screw part is a spiral groove provided on an inner peripheral side of the third nut main body part,
wherein the third nut rack tooth part is rack teeth provided on an outer peripheral side of the third nut main body part,
wherein the third circulating ball is provided between the steering-output-shaft-side ball screw groove and the third nut-side ball screw part, so as to transmit a rotation force of the steering output shaft to the third nut,
wherein the sector gear is provided so as to mesh with the third nut rack tooth part so as to be rotatable with movement of the third nut,
wherein the pitman arm is provided between the sector gear and the steered wheels so as to steer the steered wheels with rotation of the sector gear, and
wherein the steering shaft is connected between the sector gear and the steered wheels in the steering mechanism.

2. The steering apparatus according to claim 1, further comprising a first ECU and a second ECU,
wherein the first ECU and the second ECU are provided such that, in the direction of the rotation axis of the first motor output shaft, the first ECU, the first electric motor, the first motor pulley, the second motor pulley, the second electric motor and the second ECU are arranged in this order,
wherein the first ECU includes a first microprocessor, and the first microprocessor outputs a first command signal for driving and controlling the first electric motor, and
wherein the second ECU includes a second microprocessor, and the second microprocessor outputs a second command signal for driving and controlling the second electric motor.

3. The steering apparatus according to claim 2, further comprising a first connector and a second connector,
wherein the first connector and the second connector are disposed such that, in the direction of the rotation axis of the first motor output shaft, the first connector, the first ECU, the first electric motor, the first motor pulley, the second motor pulley, the second electric motor, the second ECU and the second connector are arranged in this order, and
wherein a first power supply wiring for supplying power to the first ECU can be connected to the first connector, and a second power supply wiring for supplying power to the second ECU can be connected to the second connector.

4. The steering apparatus according to claim 1, both of the first circulating ball and the second circulating ball can be circulated in a part of a region of the steering-shaft-side ball screw part.

5. The steering apparatus according to claim 1, wherein the first nut is formed integrally with the second nut.

6. The steering apparatus according to claim 1, wherein the first electric motor and the second electric motor are disposed such that, in a cross section orthogonal to the first axis, the rotation axis of the first motor output shaft and the rotation axis of the second motor output shaft are arranged apart from each other.

7. A steering apparatus comprising:
a steering shaft including a steering shaft main body part and a steering-shaft-side ball screw part, wherein the steering shaft main body part has a bar shape, and is capable of steering steered wheels by a movement of the steering shaft in a longitudinal direction of the steering shaft main body part, and wherein the steering-shaft-side ball screw part is a spiral groove provided on an outer periphery of the steering shaft main body part;
a first nut including a first nut main body part and a first nut-side ball screw part, wherein the first nut main body part has a cylindrical shape and the steering shaft is inserted into the first nut main body part, and wherein the first nut-side ball screw part is a spiral groove provided on an inner peripheral side of the first nut main body part;
a first circulating ball provided between the steering-shaft-side ball screw part and the first nut-side ball screw part so as to transmit a rotation force of the first nut to the steering shaft;
a first nut pulley capable of rotating integrally with the first nut;
a first electric motor including a first motor output shaft, wherein when an axis passing through a center of the steering shaft in a cross section orthogonal to a longitudinal direction of the steering shaft and arranged parallel to the longitudinal direction of the steering shaft is set as a first axis, the first motor output shaft is disposed such that a rotation axis of the first motor output shaft is offset to the first axis;
a first motor pulley capable of rotating integrally with the first motor output shaft;
a first endless belt wound between the first nut pulley and the first motor pulley;
a second nut including a second nut main body part and a second nut-side ball screw part, wherein the second nut main body part has a cylindrical shape and is disposed so as to be offset to the first nut in a direction of the first axis, and the steering shaft is inserted into the second nut main body part, and wherein the second nut-side ball screw part is a spiral groove provided on an inner peripheral side of the second nut main body part;
a second circulating ball provided between the steering-shaft-side ball screw part and the second nut-side ball screw part so as to transmit a rotation force of the second nut to the steering shaft;
a second nut pulley capable of rotating integrally with the second nut;

a second electric motor including a second motor output shaft, wherein the second motor output shaft is disposed such that a rotation axis of the second motor output shaft is offset to the first axis;

a second motor pulley capable of rotating integrally with the second motor output shaft, and provided such that, in a direction of the rotation axis of the first motor output shaft, the first electric motor, the first motor pulley, the second motor pulley and the second electric motor are arranged in this order;

a second endless belt wound between the second nut pulley and the second motor pulley; and a first housing and a second housing, wherein the first housing is equipped with a first steering shaft accommodating part and a first reduction gear accommodating part, wherein the first steering shaft accommodating part has a cylindrical shape, and is equipped with, on an inner side thereof, a first steering shaft accommodating space into which the steering shaft is accommodated, wherein the first reduction gear accommodating part has a cylindrical shape, and is equipped with, on an inner side thereof, a first reduction gear accommodating space accommodating the first nut, the first nut pulley, the first motor pulley and the first endless belt, wherein the second housing is equipped with a second steering shaft accommodating part and a second reduction gear accommodating part, wherein the second steering shaft accommodating part has a cylindrical shape, and is equipped with, on an inner side thereof, a second steering shaft accommodating space into which the steering shaft is accommodated, wherein the second reduction gear accommodating part has a cylindrical shape, and is equipped with, on an inner side thereof, a second reduction gear accommodating space accommodating the second nut, the second nut pulley, the second motor pulley and the second endless belt, wherein the first reduction gear accommodating space is equipped with a first reduction gear accommodating space opening end portion of which an end portion on a side facing the second reduction gear accommodating space is opened, in the direction of the rotation axis of the first motor output shaft, wherein the second reduction gear accommodating space is equipped with a second reduction gear accommodating space opening end portion of which an end portion on a side facing the first reduction gear accommodating space is opened, in a direction of the rotation axis of the second motor output shaft, and wherein the first reduction gear accommodating space opening end portion and the second reduction gear accommodating space opening end portion are provided so as to come in contact with each other.

8. The steering apparatus according to claim 7, wherein the first reduction gear accommodating part is equipped with a first motor output shaft insertion hole provided on an opposite side of the first reduction gear accommodating space opening end portion, in the direction of the rotation axis of the first motor output shaft, wherein the first motor output shaft is inserted into the first reduction gear accommodating space through the first motor output shaft insertion hole, in the direction of the rotation axis of the first motor output shaft, wherein the second reduction gear accommodating part is equipped with a second motor output shaft insertion hole provided on an opposite side of the second reduction gear accommodating space opening end portion, in the direction of the rotation axis of the second motor output shaft, and wherein the second motor output shaft is inserted into the second reduction gear accommodating space through the second motor output shaft insertion hole, in the direction of the rotation axis of the second motor output shaft.

9. The steering apparatus according to claim 1, wherein the steering mechanism includes a torsion bar and a torque sensor, wherein the steering output shaft is connected to the steering input shaft via the torsion bar, wherein the torque sensor is capable of outputting a steering torque signal according to a relative angle between the steering input shaft and the steering output shaft according to a twist amount of the torsion bar, and wherein the first electric motor and the second electric motor are driven and controlled according to a motor command signal according to the steering torque signal.

10. The steering apparatus according to claim 1, further comprising a steering angle sensor, wherein the steering angle sensor is provided to the steering input shaft, and is capable of outputting a steering angle signal according to a steering angle of the steered wheels, based on a rotation amount of the steering input shaft, and wherein the first electric motor and the second electric motor are driven and controlled according to a motor command signal according to the steering angle signal.

11. A steering apparatus comprising:

a steering shaft including a steering shaft main body part and a steering-shaft-side ball screw part, wherein the steering shaft main body part has a bar shape, and is capable of steering steered wheels by a movement of the steering shaft in a longitudinal direction of the steering shaft main body part, and wherein the steering-shaft-side ball screw part is a spiral groove provided on an outer periphery of the steering shaft main body part;

a first nut including a first nut main body part and a first nut-side ball screw part, wherein the first nut main body part has a cylindrical shape and the steering shaft is inserted into the first nut main body part, and wherein the first nut-side ball screw part is a spiral groove provided on an inner peripheral side of the first nut main body part;

a first circulating ball provided between the steering-shaft-side ball screw part and the first nut-side ball screw part so as to transmit a rotation force of the first nut to the steering shaft;

a first nut pulley capable of rotating integrally with the first nut;

a first electric motor including a first motor output shaft, wherein when an axis passing through a center of the steering shaft in a cross section orthogonal to a longitudinal direction of the steering shaft and arranged parallel to the longitudinal direction of the steering shaft is set as a first axis, the first motor output shaft is disposed such that a rotation axis of the first motor output shaft is offset to the first axis;

a first motor pulley capable of rotating integrally with the first motor output shaft;

a first endless belt wound between the first nut pulley and the first motor pulley;

a second nut including a second nut main body part and a second nut-side ball screw part, wherein the second nut main body part has a cylindrical shape and is disposed so as to be offset to the first nut in a direction of the first axis, and the steering shaft is inserted into the second nut main body part, and wherein the second nut-side ball screw part is a spiral groove provided on an inner peripheral side of the second nut main body part;

a second circulating ball provided between the steering-shaft-side ball screw part and the second nut-side ball screw part so as to transmit a rotation force of the second nut to the steering shaft;

a second nut pulley capable of rotating integrally with the second nut;

a second electric motor including a second motor output shaft, wherein the second motor output shaft is disposed such that a rotation axis of the second motor output shaft is offset to the first axis;

a second motor pulley capable of rotating integrally with the second motor output shaft, and provided such that, in a direction of the rotation axis of the first motor output shaft, the first electric motor, the first motor pulley, the second motor pulley and the second electric motor are arranged in this order;

a second endless belt wound between the second nut pulley and the second motor pulley; and a pinion shaft, a worm wheel, a worm shaft and a third electric motor, wherein the steering shaft is equipped with a steering shaft rack tooth part provided on an outer periphery of the steering shaft main body part, wherein the pinion shaft includes a pinion shaft main body part and a pinion tooth part, wherein the pinion shaft main body part has a bar shape, wherein the pinion tooth part is provided on an outer peripheral side of the pinion shaft main body part, so as to mesh with the steering shaft rack tooth part, wherein the worm wheel is provided rotatably integrally with the pinion shaft, and is equipped with a worm wheel tooth part, wherein the worm shaft is equipped with a worm shaft tooth part which meshes with the worm wheel tooth part, and wherein the third electric motor includes a third motor output shaft connected to the worm shaft.

* * * * *